US012574623B2

(12) United States Patent
Im et al.

(10) Patent No.: US 12,574,623 B2
(45) Date of Patent: Mar. 10, 2026

(54) CAMERA MODULE

(71) Applicant: SAMSUNG ELECTRO-MECHANICS CO., LTD., Suwon-si (KR)

(72) Inventors: Ah Hyeon Im, Suwon-si (KR); Ta Kyoung Lee, Suwon-si (KR); Bong Won Jeong, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/591,657

(22) Filed: Feb. 3, 2022

(65) Prior Publication Data

US 2022/0159155 A1     May 19, 2022

Related U.S. Application Data

(63) Continuation of application No. 16/783,332, filed on Feb. 6, 2020, now Pat. No. 11,277,550, which is a
(Continued)

(30) Foreign Application Priority Data

Jun. 16, 2017     (KR) ......................... 10-2017-0076728

(51) Int. Cl.
H04N 23/55          (2023.01)
G02B 7/10          (2021.01)
(Continued)

(52) U.S. Cl.
CPC ............. H04N 23/55 (2023.01); G02B 7/102 (2013.01); G02B 13/009 (2013.01); G02B 15/14 (2013.01);
(Continued)

(58) Field of Classification Search
CPC ...... H04N 23/55; H04N 23/51; H04N 23/687; H04N 23/69; G02B 7/102; G02B 13/009;
(Continued)

(56) References Cited

U.S. PATENT DOCUMENTS

| | | | | |
|---|---|---|---|---|
| 8,305,482 B2* | 11/2012 | Yen | ........................ | G02B 7/023 |
| | | | | 348/208.2 |
| 9,020,334 B1 | 4/2015 | Suzuka | | |

(Continued)

FOREIGN PATENT DOCUMENTS

| | | |
|---|---|---|
| CN | 103376613 A | 10/2013 |
| CN | 103676405 A | 3/2014 |

(Continued)

OTHER PUBLICATIONS

Chinese Office Action issued on May 17, 2022, in counterpart Chinese Patent Application No. 202110907435.4 (3 pages in English and 5 pages in Chinese).
(Continued)

*Primary Examiner* — Twyler L Haskins
*Assistant Examiner* — John H Morehead, III
(74) *Attorney, Agent, or Firm* — NSIP Law

(57) ABSTRACT

A camera module includes: a housing; a reflecting module; and a lens module disposed behind the reflecting module, wherein the moving holder is disposed to be movable in one axial direction, approximately perpendicular to the optical axial direction and the one axial direction with respect to the housing, the lens module includes a carrier supported by the housing to be linearly movable in approximately the optical axial direction, the lens module includes two or more lens barrels of which some are fixed, and the others are supported by the housing to be linearly movable in approximately the optical axial direction, and lenses are distributed and provided into the at least two lens barrels.

17 Claims, 14 Drawing Sheets

Related U.S. Application Data continuation of application No. 16/411,469, filed on May 14, 2019, now Pat. No. 10,594,911, which is a continuation of application No. 15/835,658, filed on Dec. 8, 2017, now Pat. No. 10,334,146.

(51) Int. Cl.

| | |
|---|---|
| *G02B 13/00* | (2006.01) |
| *G02B 15/14* | (2006.01) |
| *H04N 23/51* | (2023.01) |
| *H04N 23/68* | (2023.01) |
| *H04N 23/69* | (2023.01) |

(52) U.S. Cl.
CPC ........... *H04N 23/51* (2023.01); *H04N 23/687* (2023.01); *H04N 23/69* (2023.01)

(58) Field of Classification Search
CPC ........ G02B 15/14; G02B 15/163; G02B 7/09; G03B 5/00; G03B 17/17; G03B 30/00
See application file for complete search history.

(56) References Cited

U.S. PATENT DOCUMENTS

| | | | |
|---|---|---|---|
| 9,557,536 B2 | 1/2017 | Ozaki et al. | |
| 2006/0109567 A1* | 5/2006 | Chen .................. | G02B 13/0065 |
| | | | 359/696 |
| 2006/0125950 A1* | 6/2006 | Chen ...................... | G03B 13/32 |
| | | | 348/E5.027 |
| 2006/0209437 A1* | 9/2006 | Miyamoto ............. | G03B 17/17 |
| | | | 359/824 |
| 2006/0269263 A1 | 11/2006 | Kim et al. | |
| 2007/0031134 A1* | 2/2007 | Kuroda ................ | G02B 13/007 |
| | | | 396/55 |
| 2007/0070529 A1* | 3/2007 | Chen .................... | G02B 13/009 |
| | | | 359/819 |
| 2007/0216774 A1 | 9/2007 | Shin | |
| 2008/0122923 A1* | 5/2008 | Chang .................. | H04N 13/243 |
| | | | 348/44 |
| 2009/0103195 A1* | 4/2009 | Tsai .......................... | H02K 7/14 |
| | | | 359/824 |
| 2009/0129412 A1* | 5/2009 | Kim ........................ | G02B 27/62 |
| | | | 372/6 |
| 2009/0153726 A1* | 6/2009 | Lim ................... | G02B 17/0856 |
| | | | 348/360 |
| 2010/0231779 A1* | 9/2010 | Lin .......................... | G03B 37/04 |
| | | | 348/335 |
| 2013/0021485 A1* | 1/2013 | Hsu ........................ | G02B 27/64 |
| | | | 348/208.99 |
| 2013/0128360 A1* | 5/2013 | Minamisawa ......... | G02B 27/64 |
| | | | 359/554 |
| 2013/0278785 A1 | 10/2013 | Nomura et al. | |
| 2013/0321938 A1* | 12/2013 | Ohno ....................... | G02B 7/08 |
| | | | 359/824 |
| 2014/0009631 A1 | 1/2014 | Topliss | |
| 2015/0042870 A1 | 2/2015 | Chan et al. | |
| 2015/0109485 A1* | 4/2015 | Ozaki .................. | G02B 27/646 |
| | | | 359/557 |
| 2015/0110480 A1 | 4/2015 | Suzuka | |
| 2015/0373252 A1* | 12/2015 | Georgiev ............... | H04N 23/58 |
| | | | 348/349 |
| 2016/0006963 A1* | 1/2016 | Jao ......................... | G03B 13/32 |
| | | | 348/311 |
| 2016/0330375 A1* | 11/2016 | Sekimoto ............... | H04N 23/55 |
| 2016/0341975 A1* | 11/2016 | Kim ........................ | G03B 3/10 |
| 2016/0377827 A1* | 12/2016 | Kang ..................... | H04N 23/51 |
| | | | 359/784 |
| 2017/0108660 A1* | 4/2017 | Kuo ......................... | G02B 7/08 |
| 2017/0139225 A1 | 5/2017 | Lim | |
| 2017/0146771 A1* | 5/2017 | Ho .......................... | H04N 23/54 |
| 2017/0160558 A1* | 6/2017 | Kim ....................... | H02K 11/21 |
| 2017/0163856 A1* | 6/2017 | Wang .................... | G02B 7/023 |
| 2017/0276899 A1* | 9/2017 | Onishi .................... | G02B 7/04 |
| 2018/0231793 A1* | 8/2018 | Jeong ..................... | G03B 5/00 |

FOREIGN PATENT DOCUMENTS

| | | |
|---|---|---|
| CN | 204203597 U | 3/2015 |
| CN | 105556385 A | 5/2016 |
| JP | 8-248291 A | 9/1996 |
| JP | 3414040 B2 | 6/2003 |
| JP | 2009-300761 A | 12/2009 |
| JP | 2015-79229 A | 4/2015 |
| KR | 10-2006-0124418 A | 12/2006 |
| KR | 10-0803276 B1 | 2/2008 |
| KR | 10-2009-0103958 A | 10/2009 |
| KR | 10-2010-0125978 A | 12/2010 |
| KR | 10-2014-0014787 A | 2/2014 |
| KR | 10-1586244 B1 | 1/2016 |
| KR | 10-2016-0042066 A | 4/2016 |
| KR | 10-2017-0056387 A | 5/2017 |
| KR | 10-1742500 B1 | 6/2017 |
| WO | WO 2008/090561 A2 | 7/2008 |
| WO | WO 2015/021279 A1 | 2/2015 |

OTHER PUBLICATIONS

Chinese Office Action dated Jun. 15, 2020 issued in the related Chinese Patent Application No. 201810133149.5 (5 pages in English and 7 pages in Chinese).

Korean Office Action issue on Apr. 7, 2020 in counterpart Korean Patent Application No. 10-2020-0003560 (7 pages in English, 6 pages in Korean).

Korean Office Action issued on May 28, 2019 in counterpart Korean Patent Application No. 10-2017-0076728 (6 pages in English and 5 pages in Korean).

Korean Office Action issued on Oct. 26, 2020 in counterpart Korean Application No. 10-2020-0003560 (8 pages in English, 6 pages in Chinese).

Korean Office Action issued on Oct. 29, 2018, in corresponding Korean Application No. 10-2017-0076728 (8 pages in English, 5 pages in Korean).

Korean Notice of Reason for Rejection issued on Dec. 20, 2021 in corresponding Korean Patent Application No. 10-2021-0128904 (8 pages in English and 6 pages in Korean).

\* cited by examiner

CAMERA MODULE

CROSS-REFERENCE TO RELATED APPLICATIONS

This application is a continuation of U.S. patent application Ser. No. 16/783,332 filed on Feb. 6, 2020, now U.S. Pat. No. 11,277,550 issued on Mar. 15, 2022, which is a continuation of U.S. patent application Ser. No. 16/411,469 filed on May 14, 2019, now U.S. Pat. No. 10,594,911 issued on Mar. 17, 2020, which is a continuation of U.S. patent application Ser. No. 15/835,658 filed on Dec. 8, 2017, now U.S. Pat. No. 10,334,146 issued on Jun. 25, 2019, which claims the benefit under 35 USC § 119 (a) of Korean Patent Application No. 10-2017-0076728 filed on Jun. 16, 2017, in the Korean Intellectual Property Office, the entire disclosures of which are incorporated herein by reference for all purposes.

BACKGROUND

1. Field

The following description relates to a camera module.

2. Description of Related Art

Recently, camera modules have been generally installed in portable electronic devices such as tablet personal computers (PCs), laptop computers, and the like, as well as in smartphones, and an auto-focusing (AF) function, an optical image stabilization (OIS) function, a zoom function, and the like, have been added to camera modules for mobile terminals.

However, in order to implement various functions, the structure of such camera modules has become complicated and the size of such camera modules has increased, resulting in an increase in a size of portable electronic devices in which camera modules are mounted.

In addition, when a lens or an image sensor is directly moved for the purposes of optical image stabilization, both a weight of the lens or of the image sensor itself and weights of other members to which the lens or the image sensor is attached should be considered, and a certain level of driving force or more is thus required, resulting in increased power consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing having an internal space, a reflecting module disposed in the internal space and including a reflecting member and a moving holder movably supported by an inner wall of the housing, and a lens module disposed behind the reflecting module in the internal space, including lenses aligned in an optical axial direction configured such that light reflected from the reflecting member is incident to the lenses, wherein the moving holder is configured to be movable in one axial direction, approximately perpendicular to the optical axial direction and the one axial direction with respect to the housing, the lens module comprises a carrier supported by the housing configured to be linearly movable in approximately the optical axial direction, the lens module comprises two or more lens barrels, wherein some are fixed, and the others are supported by the housing configured to be linearly movable in approximately the optical axial direction, and the lenses are distributed and disposed in the two or more lens barrels.

The lens barrels may include a first lens barrel fixed to the carrier and one or more second lens barrels may be movably disposed in the carrier.

One or more lens disposed in the first lens barrel and one or more lens disposed in the second lens barrel may be aligned approximately parallel with each other in the optical axial direction.

First ball bearings may be disposed between the housing and a bottom plate of the carrier.

The carrier may include a first magnet configured to generate driving force in the optical axial direction in response to a coil disposed in the housing.

The housing may have a first pulling yoke disposed on a bottom surface thereof, the first pulling yoke configured to allow the carrier to be supported by the bottom surface of the housing by attractive force between the first pulling yoke and the first magnet.

First seating grooves in which the ball bearings are seated may be disposed in a bottom surface of the housing and the bottom plate of the carrier facing each other.

First seating grooves disposed in the housing or the carrier may be provided to be elongate in the optical axial direction.

Second ball bearings may be disposed between a bottom plate of the carrier and the second lens barrel.

The second lens barrel may include a second magnet configured to generate driving force in the optical axial direction in response to a coil disposed in the housing.

The carrier includes a second pulling yoke disposed on a bottom surface thereof, the second pulling yoke allowing the second lens barrel to be supported by the bottom surface of the carrier by attractive force between the second pulling yoke and the second magnet.

Second seating grooves, in which second ball bearings are seated, may be disposed in a bottom surface of the carrier and a bottom of the second lens barrel facing each other.

Second seating grooves may be disposed in the carrier or the second lens barrel, of the second seating grooves, may be disposed to be elongate in the optical axial direction.

The second magnet may be configured to be exposed externally of the carrier to face the coil provided in the housing.

A lens barrel fixed to the carrier, of the lens barrels, is configured to control an auto-focusing (AF) function, and a lens barrel moved movable in the carrier, of the lens barrels, is configured to control a zoom function.

A lens barrel fixed to the carrier, of the lens barrels, is disposed at a rearmost portion.

A portable electronic device including a camera module as described above.

An optical axis of the lenses may be in a direction generally perpendicular to a thickness direction of the portable electronic device.

Other features and aspects will be apparent from the following detailed description, the drawings, and the claims.

BRIEF DESCRIPTION OF DRAWINGS

FIGS. 3A and 3B are cross-sectional views of a camera module according to an embodiment;

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
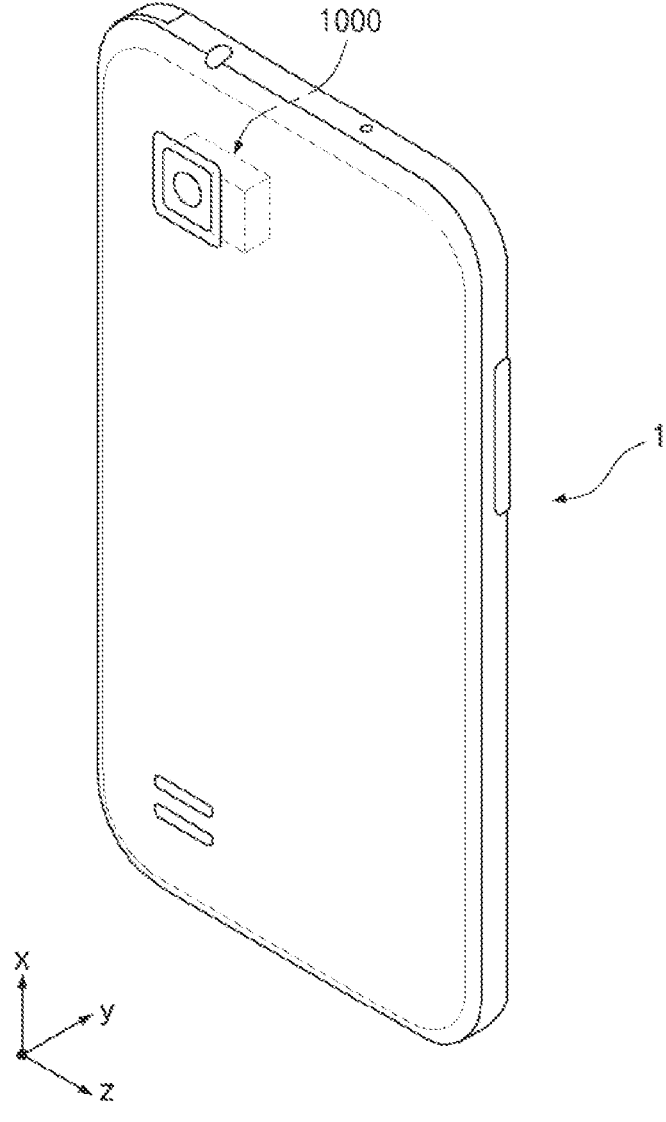
FIG. 1 is a perspective view of a portable electronic device according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a perspective view of a portable electronic device according to an embodiment.

Referring to FIG. 1, a portable electronic device 1 according to an embodiment may be a portable electronic device such as a mobile communications terminal, a smartphone, a tablet personal computer (PC), or the like, in which a camera module 1000 is mounted.

As shown in FIG. 1, the portable electronic device 1 may be mounted with the camera module 1000 to capture an image of a subject.

In an embodiment, the camera module 1000 may include lenses, and an optical axis (a Z axis) of each of the lenses may be directed toward a direction perpendicular to a thickness direction (a Y-axial direction or a direction from a front surface of the portable electronic device to a rear surface thereof or an opposite direction to the direction from the front surface of the portable electronic device to the rear surface thereof) of the portable electronic device 1.

As an example, the optical axis (the Z axis) of each of the plurality of lenses included in the camera module 1000 is disposed in a width direction or a length direction of the portable electronic device 1.

Therefore, even though the camera module 1000 has functions such as an auto-focusing (AF) function, a zoom function, an optical image stabilization (hereinafter, referred to as OIS) function, a thickness of the portable electronic device 1 is not increased. Therefore, the portable electronic device 1 may be miniaturized.

The camera module 1000 according to an embodiment may have the AF function, the zoom function, and the OIS function.

Since the camera module 1000 including the AF function, the zoom function, the OIS function needs to include various components, a size of the camera module is increased as compared to a general camera module.

When the size of the camera module 1000 is increased, a problem in miniaturizing the portable electronic device 1 in which the camera module 1000 is mounted occurs.

For example, when the number of stacked lenses in the camera module is increased for the purpose of the zoom function and stacked lenses are formed in the camera module in the thickness direction of the portable electronic device, a thickness of the portable electronic device is also increased depending on the number of stacked lenses. Therefore, when the thickness of the portable electronic device is not increased, the number of stacked lenses may not be sufficiently secured, such that zoom performance deteriorates.

In addition, an actuator moving lens groups in an optical axial direction or a direction perpendicular to the optical axis needs to be installed in order to implement the AF function and the OIS function, and when the optical axis (the Z axis) of the lens group is in the thickness direction of the portable electronic device, the actuator moving the lens group needs also to be installed in the thickness direction of the portable electronic device. Therefore, a thickness of the portable electronic device is increased.

However, in the camera module 1000 according to an embodiment, the optical axis (the Z axis) of each of the lenses is disposed perpendicularly to the thickness direction of the portable electronic device 1. Therefore, even though the camera module 1000 having the AF function, the zoom function, and the OIS function is mounted in the portable electronic device 1, the portable electronic device 1 is miniaturized.

Figure 2:
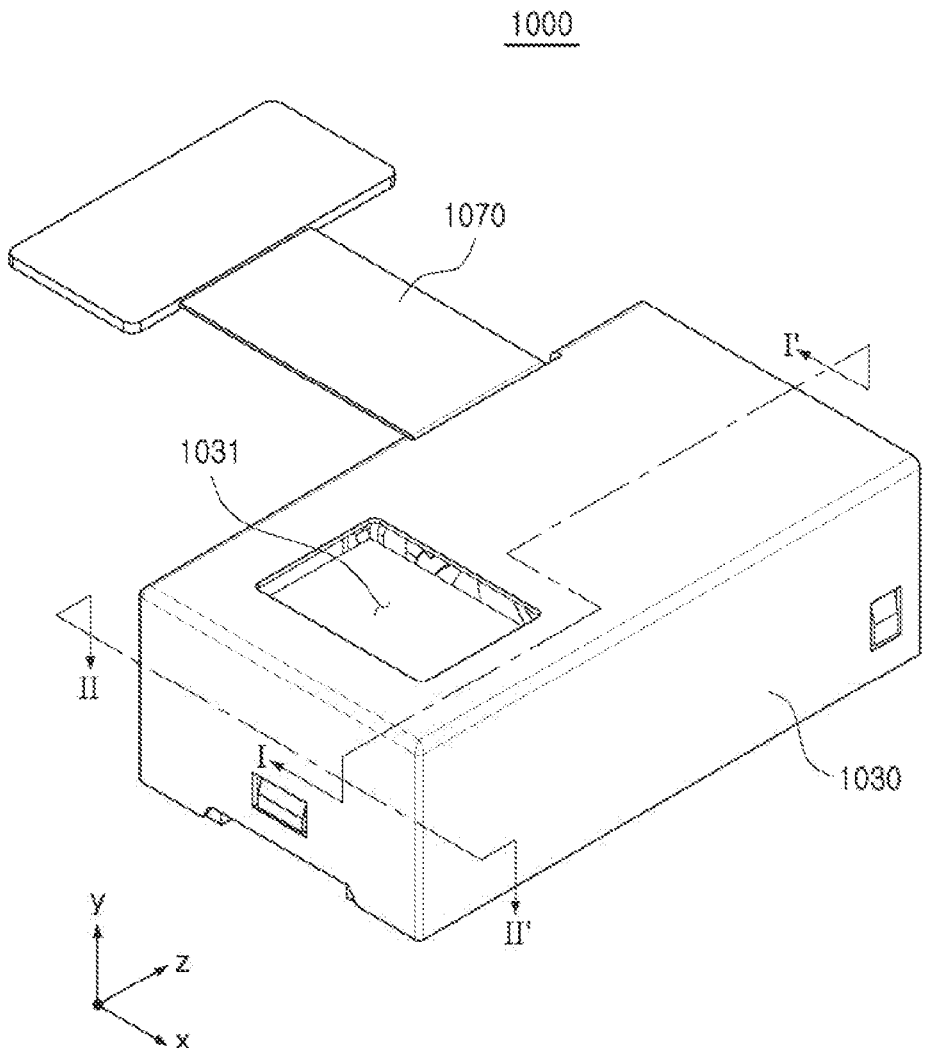
FIG. 2 is a perspective view of a camera module according to an embodiment.
Figure 3A:
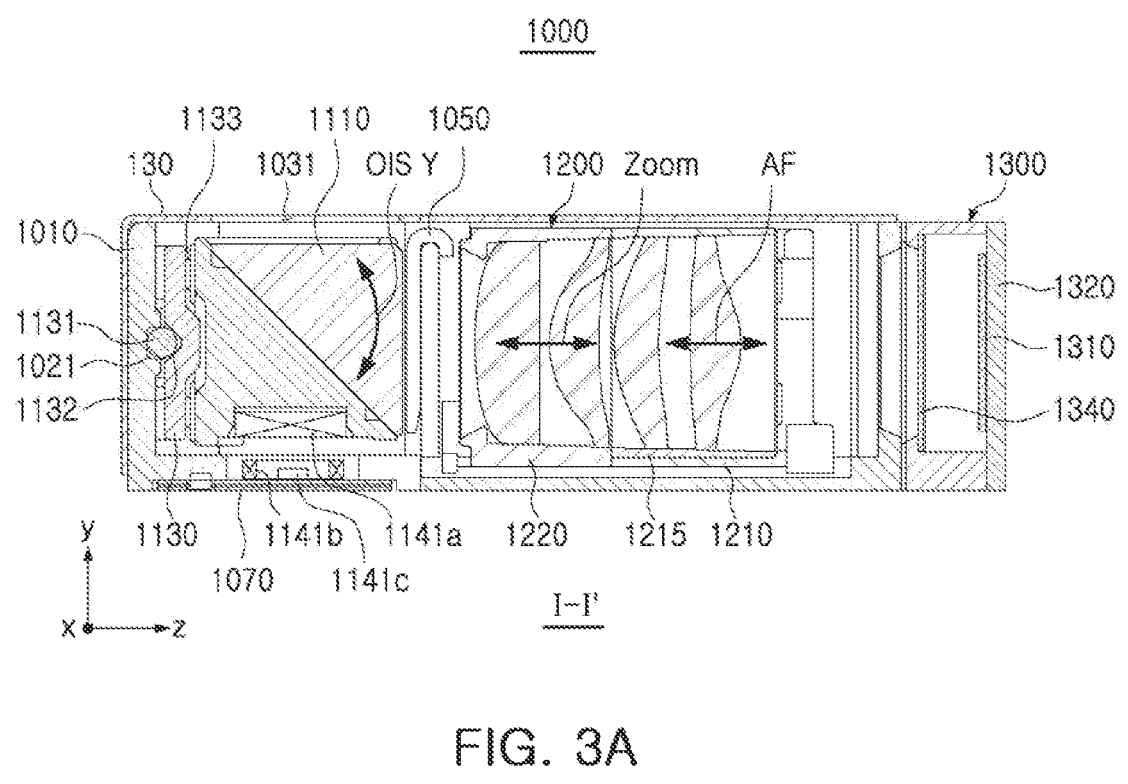
Figure 3B:
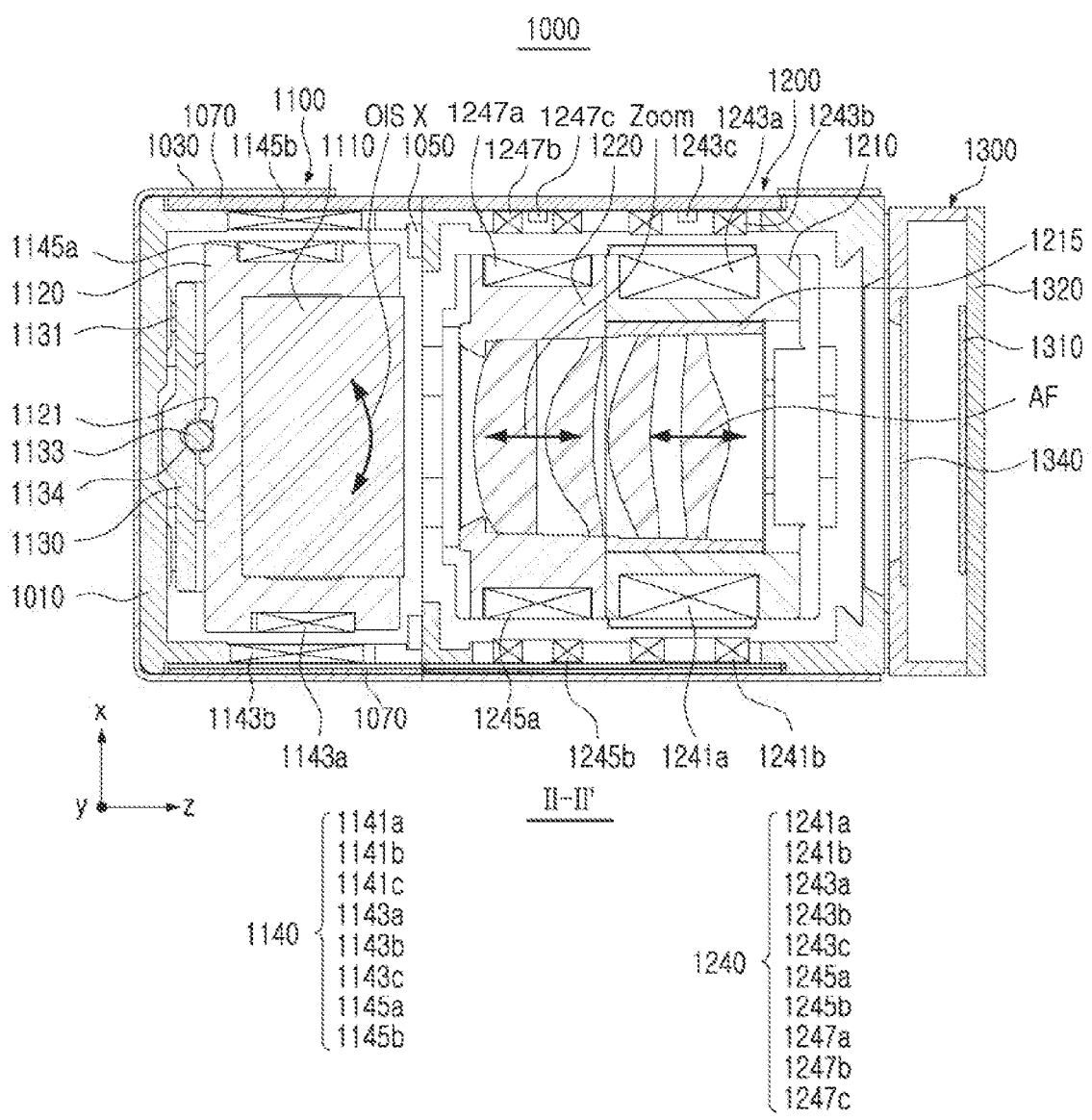
Figure 4:
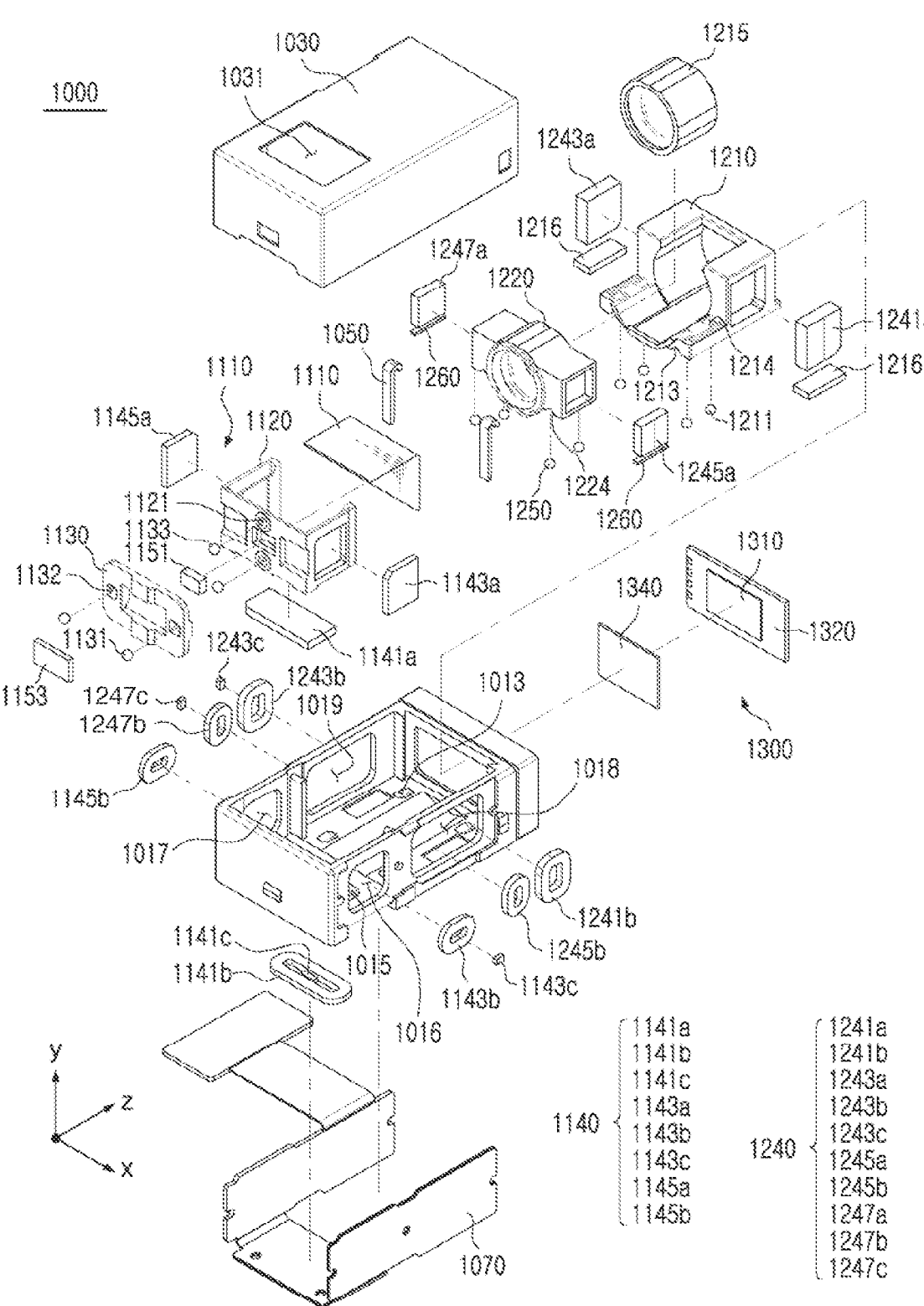
FIG. 4 is an exploded perspective view of a camera module according to an embodiment.
Figure 5:
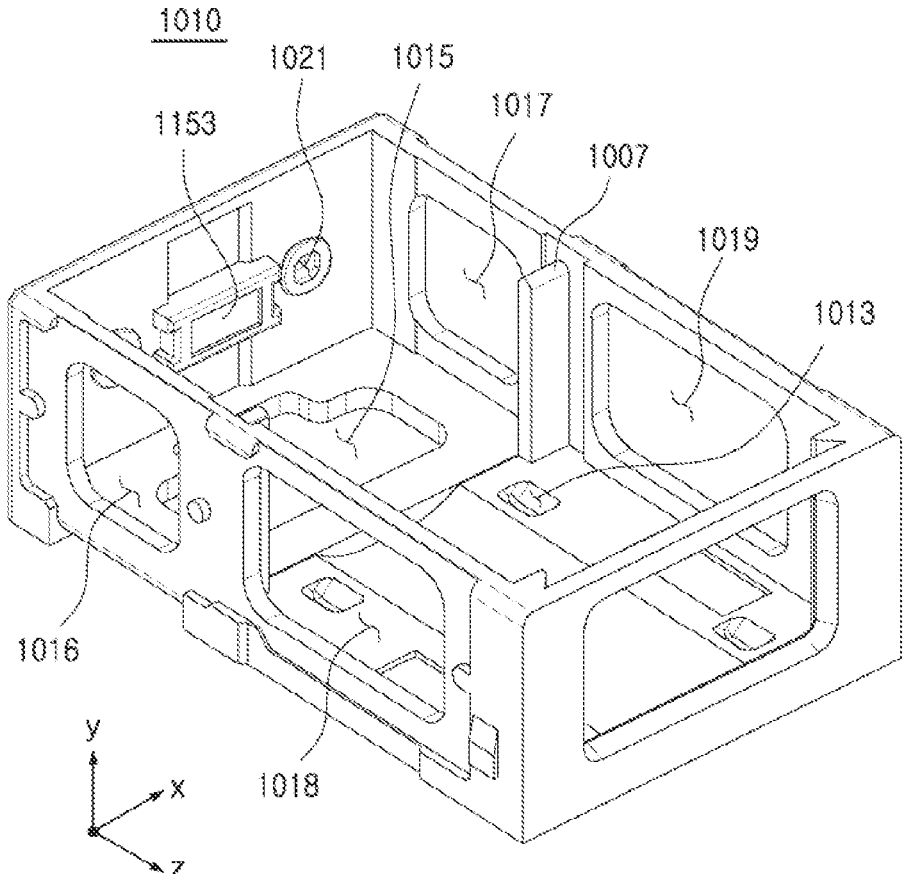
FIG. 5 is a perspective view of a housing of the camera module according to an embodiment.
Figure 6:
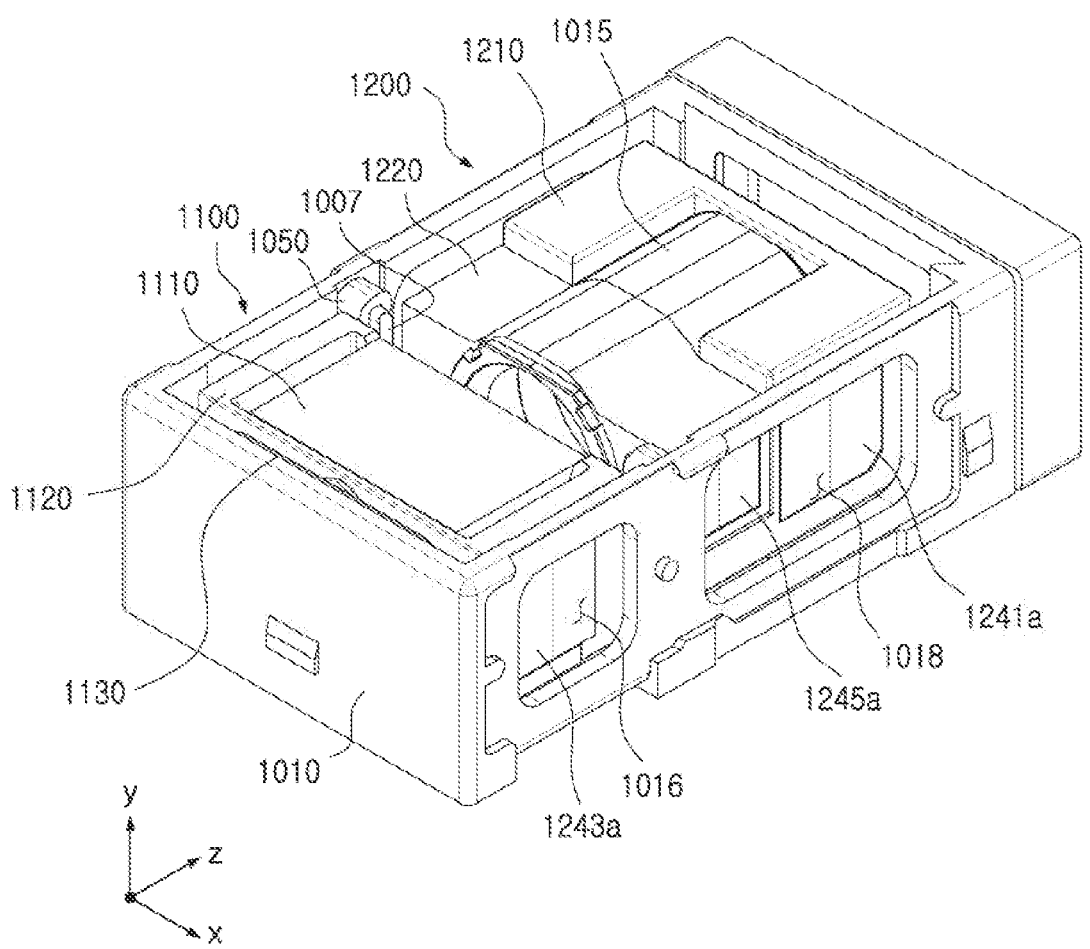
FIG. 6 is a perspective view showing that a reflecting module and a lens module are coupled to the housing of the camera module according to an embodiment.
Figure 7:
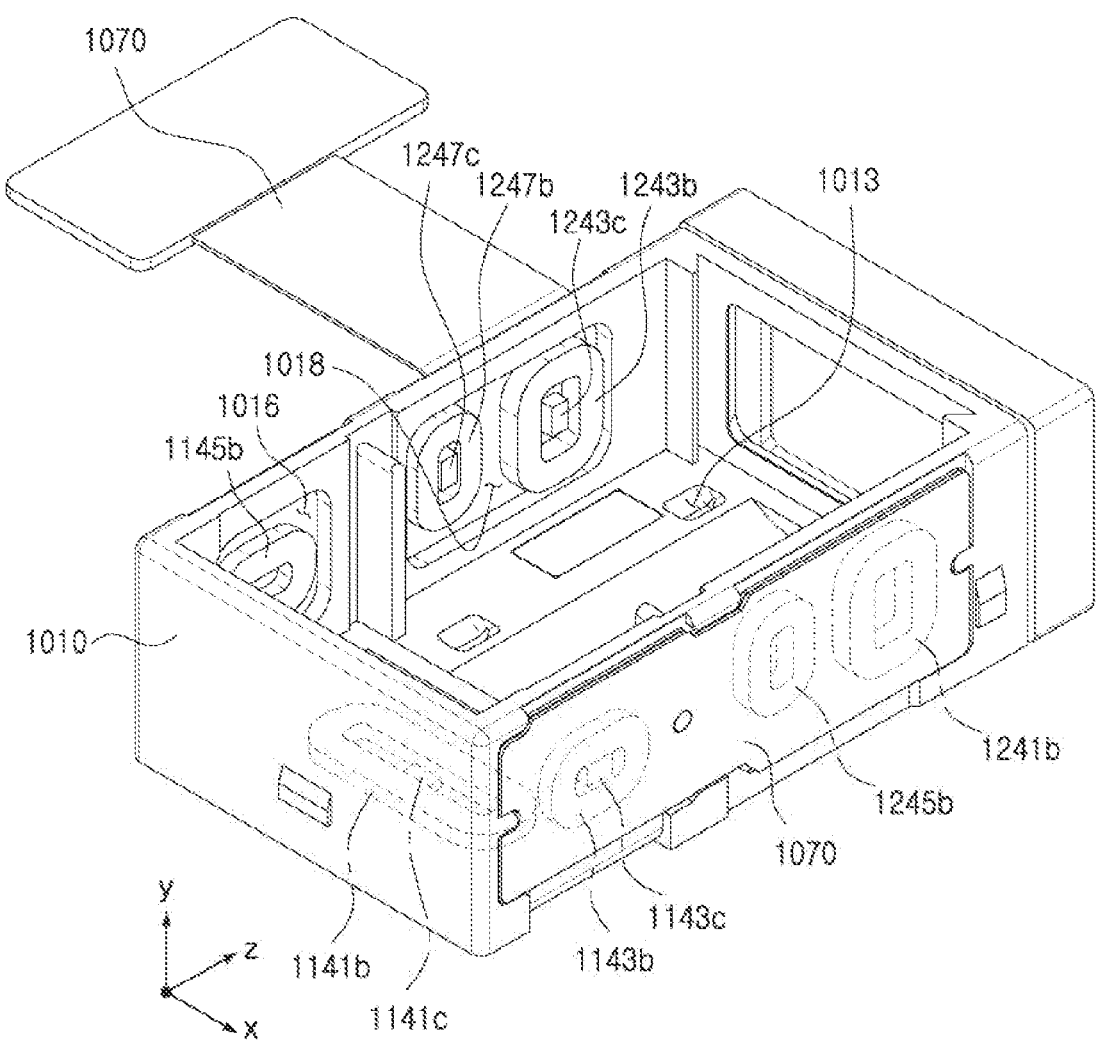
FIG. 7 is a perspective view of a board having driving coils and sensors mounted thereon coupled to the housing of the camera module according to an embodiment.
Figure 8:
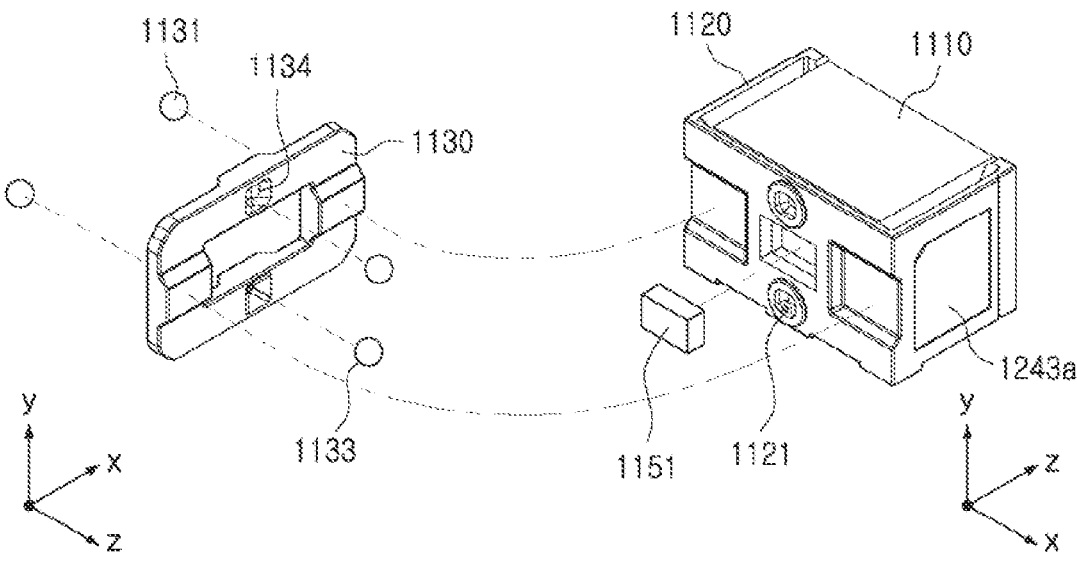
FIG. 8 is an exploded perspective view of a rotation plate and a moving holder of the camera module according to an embodiment.
Figure 9:
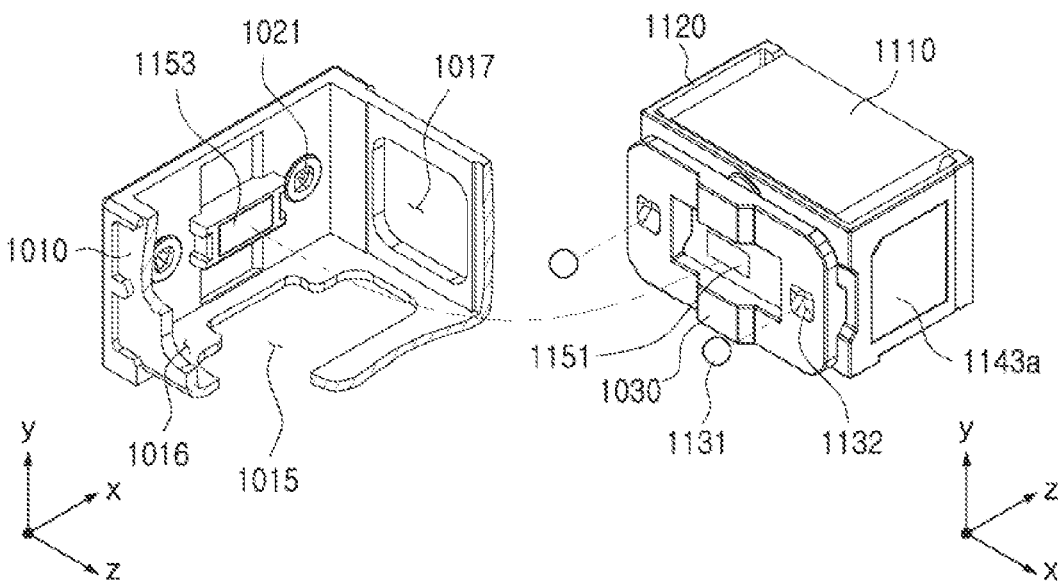
FIG. 9 is an exploded perspective view of the housing and the moving holder in the camera module according to an embodiment.
Figure 10:
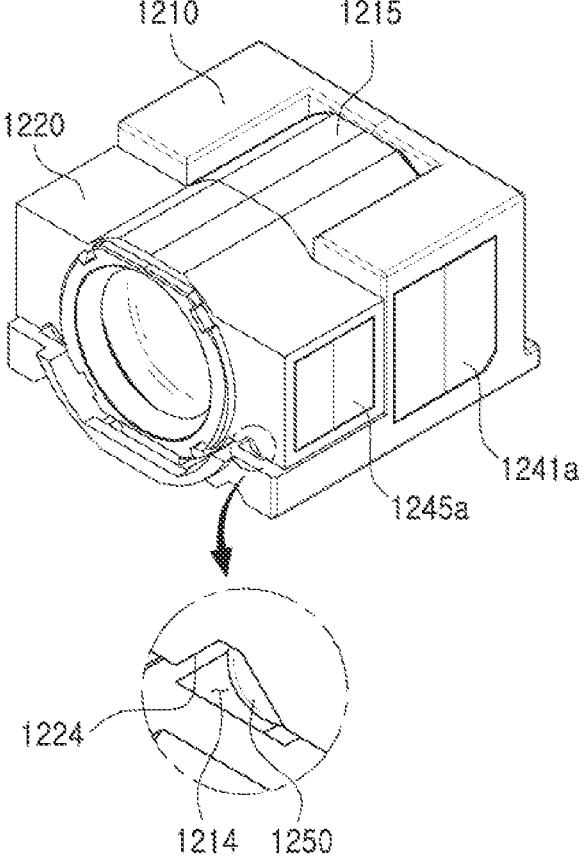
FIG. 10 is an assembled perspective view of a carrier and a lens barrel according to an embodiment.
Figure 11:
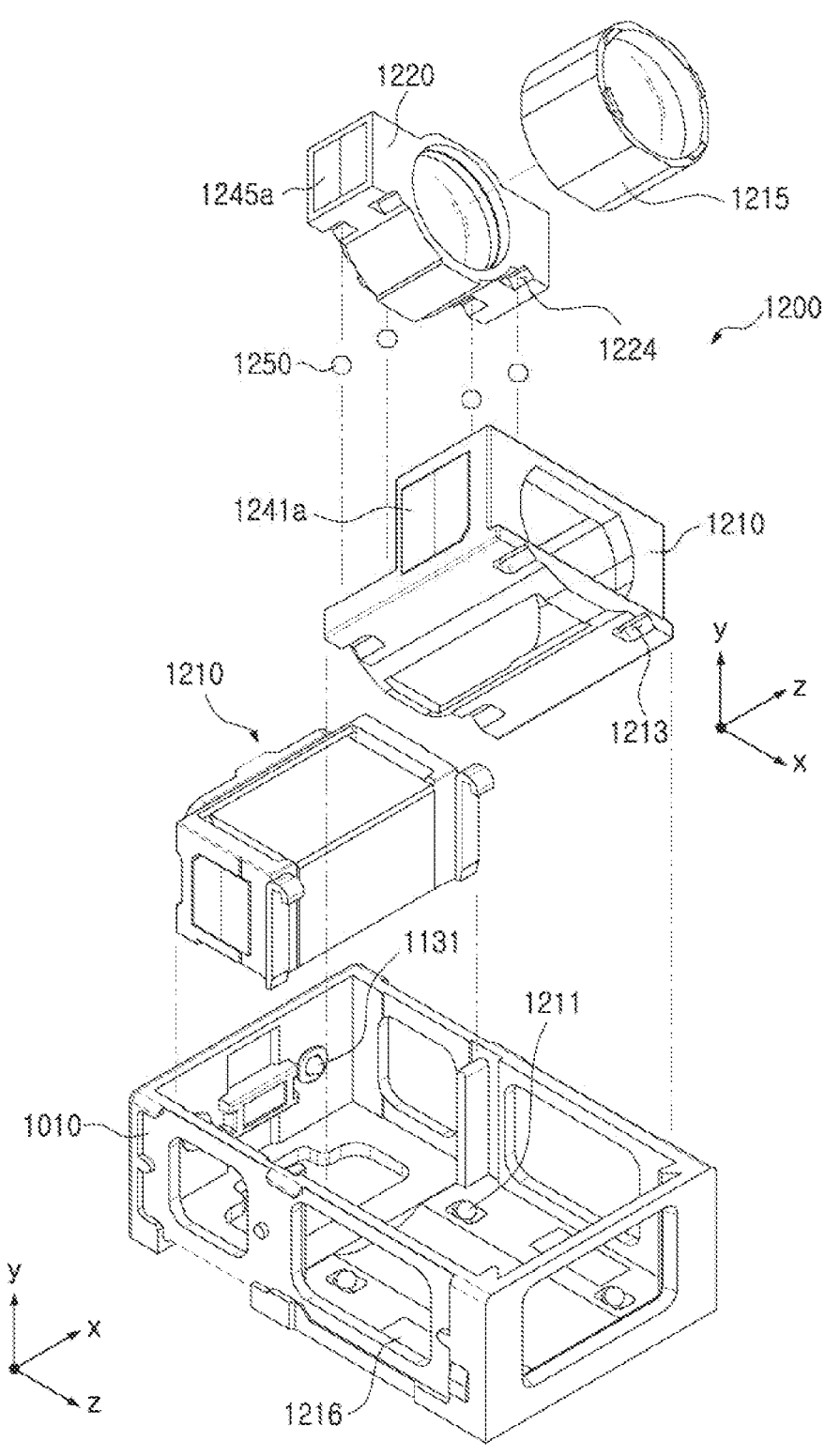
FIG. 11 is a view of a form in which the reflecting module and the lens module are coupled to the housing according to an embodiment.

FIG. 2 is a perspective view showing the camera module according to an embodiment, FIGS. 3A and 3B are cross-sectional views illustrating the camera module according to an exemplary embodiment, and FIG. 4 is an exploded perspective view illustrating the camera module according to an exemplary embodiment in the present disclosure.

Referring to FIGS. 2 through 4, the camera module 1000 according to an embodiment includes the reflecting module 1100, the lens module 1200, and the image sensor module 1300 provided in the housing 1010.

The reflecting module 1100 changes a direction of light. As an example, a moving direction of light incident through an opening 1031 of a cover 1030 covering an upper portion of the camera module 1000 is changed through the reflecting module 1100 so that the light is directed toward the lens module 1200. To this end, the reflecting module 1100 includes the reflecting member 1110 reflecting the light.

For example, a path of light incident in the thickness direction (the Y-axial direction) of the camera module 1000 is changed by the reflecting module 1100 to approximately coincide with the optical axial direction (a Z-axial direction).

The lens module 1200 includes lenses through which the light which the moving direction has been changed by the reflecting module 1100 passes through. In addition, the lens module 1200 includes a carrier 1210 including two or more lens barrels 1215 and 1220. An auto-focusing (AF) function may be implemented depending on movement of the carrier 1210 in the optical axial direction (the Z-axial direction), and a zoom function may be implemented depending on movement, in the optical axial direction (the Z-axial direction), of some of the lens barrels 1215 and 1220 included in the carrier 1210.

The image sensor module 1300 includes an image sensor 1310 converting the light passing through the lenses into an electrical signal and a printed circuit board 1320 on which the image sensor 1310 is mounted. In addition, the image sensor module 1300 includes an optical filter 1340 filtering the light that passes through the lens module 1200 and is incident thereto. The optical filter 1340 may be an infrared cut-off filter.

In an internal space of the housing 1010, the reflecting module 1100 is provided in front of the lens module 1200 and the image sensor module 1300 is provided behind the lens module 1200.

Referring to FIGS. 2 through 11, the camera module 1000 according to an embodiment includes the reflecting module 1100, the lens module 1200, and the image sensor module 1300 provided in the housing 1010.

The reflecting module 1100, the lens module 1200, and the image sensor module 1300 are sequentially provided from one side of the housing 1010 to the other side thereof in the housing 1010. The housing 1010 has an internal space into which the reflecting module 1100, the lens module 1200, and the image sensor module 1300 are inserted (the printed circuit board 1320 included in the image sensor module 1300 may be attached to an outer portion of the housing 1010).

For example, as shown in the drawings, the housing 1010 is integrally provided so that both of the reflecting module 1100 and the lens module 1200 are inserted into the internal space of the housing 1010. However, the housing 1010 is not limited thereto. For example, separate housings into which the reflecting module 1100 and the lens module 1200 are inserted, respectively, may also be connected to each other.

In addition, the housing 1010 is covered by the cover 1030 so that the internal space of the housing 1010 is not visible.

The cover 1030 has the opening 1031 through which light is incident, and a direction of the light incident through the opening 1031 is changed by the reflecting module 1100, such that the light is incident to the lens module 1200. The cover 1030 is integrally provided to cover the entire housing 1010, or may be provided as separate members each covering the reflecting module 1100 and the lens module 1200.

To this end, the reflecting module 1100 includes the reflecting member 1110 reflecting the light. In addition, the light incident to the lens module 1200 passes through the lens groups (at least two lens modules 1215 and 1220) and is then converted into and stored as an electrical signal by the image sensor 1310.

The housing 1010 includes the reflecting module 1100 and the lens module 1200 disposed in the internal space thereof. Therefore, in the internal space of the housing 1010, a space in which the reflecting module 1100 is disposed and a space in which the lens module 1200 is disposed are distinguished from each other by protruding walls 1007. In addition, the reflecting module 1100 is provided in front of the protruding walls 1007, and the lens module 1200 is provided behind the protruding walls 1007. The protruding walls 1007 protrude from opposite sidewalls of the housing 1010 to the internal space.

In the reflecting module 1100 provided in front of the protruding walls 1007, a moving holder 1120 is closely adhered and supported by an inner wall surface of the housing 1010 by attractive force between a pulling yoke 1153 provided on the inner wall surface of the housing 1010 and a pulling magnet 1151 provided in the moving holder 1120. Here, although not illustrated in the drawings, the housing 1010 may also be provided with a pulling magnet, and the moving holder 1120 may also be provided with a pulling yoke. However, a structure illustrated in the drawings will hereinafter be described for convenience of explanation.

First ball bearings 1131, a rotation plate 1130, and second ball bearings 1133 are provided between the inner wall surface of the housing 1010 and the moving holder 1120.

In addition, since the first ball bearings 1131 and the second ball bearings 1133 are closely adhered to seating grooves 1132, 1134, 1021, and 1121 while being partially inserted into the seating grooves 1132, 1134, 1021, and 1121 as described below, when the moving holder 1120 and the rotation plate 1130 are inserted into the internal space of the housing 1010, a slight space may be required between the moving holder 1120 and the protruding walls 1007, and after the moving holder 1120 is mounted in the housing 1010, the moving holder 1120 may be closely adhered to the inner wall surface of the housing 1010 by the attractive force between the pulling yoke and the pulling magnet, and a slight space may thus remain between the moving holder 1120 and the protruding walls 1007.

Therefore, in an embodiment, stoppers 1050 fitted into the protruding walls 1007 while supporting the moving holder 1120 and having a hook shape are provided (even though the stoppers 1050 are not provided, the moving holder is fixed by the attractive force between the pulling magnet 1151 and the pulling yoke 1153). The stoppers 1050 may have a hook shape, and may support the moving holder 1120 in a state in which hook portions thereof are hooked onto the protruding walls 1007.

The stoppers 1050 serve as brackets supporting the moving holder 1120 when the reflecting module 1100 is not driven, and additionally serve as the stoppers 1050 adjusting movement of the moving holder 1120 when the reflecting module 1100 is driven. The stoppers 1050 are provided, respectively, on the protruding walls 1007 protruding from the opposite sidewalls of the housing. A space is provided between the stoppers 1050 and the moving holder 1120 so that the moving holder 1120 is smoothly rotated. In addition, the stoppers 1050 are formed of an elastic material to allow the moving holder 1120 to be smoothly moved in a state in which the moving holder 1120 is supported by the stoppers 1050.

In addition, the housing 1010 includes a first driving part 1140 and a second driving part 1240 each provided in order to drive the reflecting module 1100 and the lens module 1200. The first driving part 1140 includes coils 1141b, 1143b, and 1145b for driving the reflecting module 1100, and the second driving part 1240 includes coils 1241b, 1243b, 1245b, and 1247b for driving the lens module 1200.

In addition, since the coils 1141b, 1143b, 1145b, 1241b, 1243b, 1245b, and 1247b are provided in the housing 1010 in a state in which they are mounted on a main board 1070, the housing 1010 is provided with through-holes 1015, 1016, 1017, 1018, and 1019 so that the coils 1141b, 1143b, 1145b, 1241b, 1243b, 1245b, and 1247b are exposed to the internal space of the housing 1010.

Here, the main board 1070 on which the coils 1141b, 1143b, 1145b, 1241b, 1243b, 1245b, and 1247b are mounted may be entirely connected and integrally provided, as shown in the drawings. In this case, one terminal may be provided, and connection of an external power supply and signals may thus be easy. However, the main board 1070 is not limited thereto, but may also be provided as plural boards by separating a board on which coils for the reflecting module 1100 are mounted and a board on which coils for the lens module 1200 are mounted from each other.

The reflecting module 1100 changes the path of the light incident thereto through the opening 1031. When an image or a moving picture is captured, the image may be blurred or the moving picture may be shaken due to a hand-shake, or the like, of a user. In this case, the reflecting module 1100 corrects the hand-shake of the user by moving the moving holder 1120 on which the reflecting member 1110 is mounted. For example, when a shake is generated at the time of capturing the image or the moving picture due to the hand-shake, or the like, of the user, a relative displacement corresponding to the shake is provided to the moving holder 1120 to compensate for the shake.

In addition, in the present exemplary embodiment, the OIS function is implemented by the movement of the moving holder 1120 having a relatively low weight due to absence of lenses, and the like, and power consumption may thus be significantly reduced.

That is, in an embodiment, the light in which the OIS is performed is incident to the lens module 1200 by changing the direction of the light by the movement of the moving holder 1120 on which the reflecting member 1110 is provided without moving the lens barrel including the lenses or the image sensor in order to implement the OIS function.

The reflecting module 1100 includes the moving holder 1120 provided in the housing 1010 supported by the housing 1010, the reflecting member 1110 mounted on the moving holder 1120, and the first driving part 1140 moving the moving holder 1120.

The reflecting member 1110 changes the direction of the light. For example, the reflecting member 1110 may be a mirror or a prism reflecting the light (a case in which the reflecting member 1110 is a prism is shown in the drawings associated with the exemplary embodiment for convenience of explanation).

The reflecting member 1110 is fixed to the moving holder 1120. The moving holder 1120 has a mounted surface on which the reflecting member 1110 is mounted.

The mounted surface 1123 of the moving holder 1120 has an inclined surface so that the path of the light is changed. For example, the mounted surface 1123 has an inclined surface inclined with respect to the optical axis (the Z axis) of each of the lenses by 30 to 60°. In addition, the inclined surface of the moving holder 1120 is directed toward the opening 1031 of the cover 1030 through which the light is incident.

The moving holder 1120 on which the reflecting member 1110 is mounted may be movably accommodated in an internal space of the housing 1010. For example, the moving holder 1120 is accommodated in the housing 1010 to be rotatable around a first axis (an X axis) and a second axis (a Y axis). Here, the first axis (the X axis) and a second axis (a Y axis) refer to axes perpendicular to the optical axis (the Z axis), and are perpendicular to each other.

The moving holder 1120 is supported by the housing 1010 by the first ball bearings 1131 aligned along the first axis (the X axis) and the second ball bearings 1133 aligned along the second axis (the Y axis) so that it is smoothly rotated around the first axis (the X axis) and the second axis (the Y axis).

In the drawings, two first ball bearings 1131 aligned along the first axis (the X axis) and two second ball bearings 1133 aligned along the second axis (the Y axis) are shown by way of example.

In addition, the moving holder 1120 may be rotated around the first axis (the X axis) and the second axis (the Y axis) by a first driving part 1140 to be described below.

An example in which the reflecting member 1110 is moved in a second axial direction (a Y-axial direction) or a first axial direction (an X-axial direction) by the rotation of the moving holder 1120 around the first axis (the X axis) or the second axis (the Y axis) is described in an embodiment, but the movement of the reflecting member 1110 is not limited thereto. That is, the reflecting member 1110 may also be moved in the second axial direction (the Y-axial direction) or the first axial direction (the X-axial direction) by linear movement of the moving holder 1120 in the first axial direction (the X-axial direction) or the second axial direction (the Y-axial direction).

The reflecting member 1110 is provided on the moving holder 1120, and is rotated together with the moving holder 1120 depending on the rotation of the moving holder 1120. The reflecting member 1110 is moved in the second axial direction (the Y-axial direction) by the rotation of the moving holder 1120 around the first axis (the X axis) to perform OIS in the second axial direction (the Y-axial direction) (OIS Y). In addition, the reflecting member 1110 is moved in the first axial direction (the X-axial direction) by the rotation of the moving holder 1120 around the second axis (the Y axis) to perform OIS in the first axial direction (the X-axial direction) (OIS X).

The first ball bearings 1131 and the second ball bearings 1133 are provided on a front surface and a rear surface of the rotation plate 1130, respectively. (Alternatively, the first ball bearings 1131 and the second ball bearings 1133 may also be provided on a rear surface or a front surface of the rotation plate 1130, respectively. That is, the first ball bearings 1131 may be aligned along the second axis (the Y axis) and the second ball bearings 1133 may be aligned along the first axis (the X axis), and a structure shown in the drawings will hereinafter be described for convenience of explanation). The rotation plate 1130 is provided between the moving holder 1120 and an inner surface of the housing 1010.

In addition, the moving holder 1120 is supported by the housing 1010 through the rotation plate 1130 (the first ball bearings 1131 and the second ball bearings 1133 may also be provided between the moving holder 1120 and the housing 1010) by the attractive force between the pulling magnet 1151 or the pulling yoke provided in the moving holder 1120 and the pulling yoke 1153 or the pulling magnet provided in the housing 1010.

The seating grooves 1132 and 1134 into which the first ball bearings 1131 and the second ball bearings 1133 are inserted, respectively, are provided in the front surface and the rear surface of the rotation plate 1130, respectively, and include first seating grooves 1132 into which the first ball bearings 1131 are partially inserted and second seating grooves 1134 into which the second ball bearings 1133 are partially inserted.

In addition, the housing 1010 may be provided with third seating grooves 1021 into which the first ball bearings 1131 are partially inserted, and the moving holder 1120 is provided with fourth seating grooves 1121 into which the second ball bearings 1133 are partially inserted.

The first seating grooves 1132, the second seating grooves 1134, the third seating grooves 1021, and the fourth seating grooves 1121 described above are provided in a hemispherical or polygonal (poly-prismatic or poly-pyramidal) groove shape so that the first ball bearings 1131 and the second ball bearings 1133 are easily rotated.

The first ball bearings 1131 and the second ball bearings 1133 serve as bearings while being rolled or slid in the first seating grooves 1132, the second seating grooves 1134, the third seating grooves 1021, and the fourth seating grooves 1121.

Meanwhile, the first ball bearings 1131 and the second ball bearings 1133 have a structure in which they are fixedly disposed in one or more of the housing 1010, the rotation plate 1130, and the moving holder 1120. For example, the first ball bearings 1131 are fixedly disposed in the housing 1010 or the rotation plate 1130, and the second ball bearings 1133 may be fixedly disposed in the rotation plate 1130 or the moving holder 1120.

In this example, only a member facing a member in which the first ball bearings 1131 or the second ball bearings 1133 are fixedly disposed is provided with the seating grooves. In this case, the ball bearings serve as friction bearings by sliding thereof rather than rotation thereof.

Here, when the first ball bearings 1131 and the second ball bearings 1133 are fixedly provided in any one of the housing 1010, the rotation plate 1130, and the moving holder 1120, the first ball bearings 1131 and the second ball bearings 1133 are provided in a spherical shape, a hemispherical shape, a round protrusion shape, or the like.

In addition, since the ball bearings each in charge of the first axis (the X axis) and the second axis (the Y axis) are provided, the two first ball bearings 1131 aligned along the first axis (the X axis) are provided in a cylindrical shape extended in the first axis (the X axis), and the two second ball bearings 1133 aligned along the second axis (the Y axis) are provided in a cylindrical shape extended in the second axis (the Y axis). In this case, the seating grooves 1021, 1121, 1132, and 1134 are also provided in a semi-cylindrical shape corresponding to shapes of the first and second ball bearings.

In addition, the first ball bearings 1131 and the second ball bearings 1133 may be separately manufactured and be then attached to any one of the housing 1010, the rotation plate 1130, and the moving holder 1120. Alternatively, the first ball bearings 1130 and the second ball bearings 1133 may be provided integrally with the housing 1010, the rotation plate 1130, or the moving holder 1120 at the time of manufacturing the housing 1010, the rotation plate 1130, or the moving holder 1120.

The first driving part 1140 generates driving force so that the moving holder 1120 is rotatable around the two axes.

As an example, the first driving part 1140 includes magnets 1141*a*, 1143*a*, and 1145*a* and coils 1141*b*, 1143*b*, and 1145*b* disposed to face the magnets 1141*a*, 1143*a*, and 1145*a*.

When power is applied to the coils 1141*b*, 1143*b*, and 1145*b*, the moving holder 1120 in which the magnets 1141*a*, 1143*a*, and 1145*a* are mounted is rotated around the first axis (the X axis) and the second axis (the Y axis) by electromagnetic interaction between the magnets 1141*a*, 1143*a*, and 1145*a* and the coils 1141*b*, 1143*b*, and 1145*b*.

The magnets 1141*a*, 1143*a*, and 1145*a* are mounted in the moving holder 1120. As an example, some 1141*a* of the magnets 1141*a*, 1143*a*, and 1145*a* are mounted (to be used for the OIS Y or the OIS X) on a lower surface of the moving holder 1120, and the others 1143*a* and 1145*a* of the magnets 1141*a*, 1143*a*, and 1145*a* are mounted (to be used for the OIS Y or the OIS X) on side surfaces of the moving holder 1120.

The coils 1141*b*, 1143*b*, and 1145*b* may be mounted in the housing 1010. As an example, the coils 1141*b*, 1143*b*, and 1145*b* are mounted in the housing 1010 through the main board 1070. That is, the coils 1141*b*, 1143*b*, and 1145*b* are provided on the main board 1070, and the main board 1070 is mounted in the housing 1010.

Here, an example in which the main board 1070 is entirely integrally provided so that both of the coils for the reflecting module 1100 and the coils for the lens module 1200 are mounted thereon is shown in the drawings, the main board 1070 may be provided as two or more separate boards on which the coils for the reflecting module 1100 and the coils for the lens module 1200 are mounted, respectively.

In an embodiment, when the moving holder 1120 is rotated, a closed loop control manner of sensing and feeding back a position of the moving holder 1120 is used.

Therefore, position sensors 1141*c* and 1143*c* may be required in order to perform a closed loop control. The position sensors 1141*c* and 1143*c* may be hall sensors.

The position sensors 1141*c* and 1143*c* are disposed inside or outside the coils 1141*b* and 1143*b*, respectively, and are mounted on the main board 1070 on which the coils 1141*b* and 1143*b* are mounted.

Meanwhile, the main board 1070 may be provided with a gyro sensor (not illustrated) sensing a shake factor such as the hand-shake, or the like, of the user, and may be provided with a driver integrated circuit (IC) (not illustrated) providing driving signals to the coils 1141*b*, 1143*b*, and 1145*b*.

When the moving holder 1120 is rotated around the first axis (the X axis), the moving holder 1120 is rotated depending on rotation of the rotation plate 1130 around the first ball bearings 1131 arranged along the first axis (the X axis) (in this case, the moving holder 1120 is not moved relative to the rotation plate 1130).

In addition, when the moving holder 1120 is rotated around the second axis (the Y axis), the moving holder 1120 is rotated around the second ball bearings 1133 arranged along the second axis (the Y axis) (in this case, the rotation plate 1130 is not rotated, and the moving holder 1120 is thus moved relative to the rotation plate 1130).

That is, when the moving holder 1120 is rotated around the first axis (the X axis), the first ball bearings 1131 may act, and when the moving holder 1120 is rotated around the second axis (the Y axis), the second ball bearings 1133 may act. The reason is that the second ball bearings 1133 aligned along the second axis (the Y axis) are not moved in a state in which they are fitted into the seating grooves when the moving holder 1120 is rotated around the first axis (the X axis) and the first ball bearings 1131 aligned along the first axis (the X axis) are not moved in a state in which they are fitted into the seating grooves when the moving holder 1120 is rotated around the second axis (the Y axis), as shown in the drawings.

The light reflected from the reflecting module 1100 is incident to the lens module 1200. In addition, the AF function or the zoom function for the incident light are implemented by movement, in the optical axial direction (the Z-axial direction), of the carrier 1210 and the lens barrel 1220 provided in the lens module 1200.

The stacked lens groups provided in the lens module 1200 are distributed and provided into two or more lens barrels 1215 and 1220. In addition, even though the stacked lens groups are distributed and provided into two or more lens barrels 1215 and 1220, optical axes of the lens groups is aligned in the Z-axial direction, a direction in which the light is emitted from the reflecting module 1100.

The lens module 1200 may include the second driving part 1240 in order to implement the AF function and the zoom function.

The lens module 1200 includes the carrier 1210 provided in the internal space of the housing 1010 to be movable in the optical axial direction (the Z-axial direction), one or more first lens barrel 1215 fixedly disposed in the carrier 1210 and including lenses stacked therein, one or more second lens barrel 1220 provided in the carrier 1210 to be movable in the optical axial direction (the Z-axial direction) and including lenses stacked therein, and the second driving part 1240 moving the carrier 1210 in the optical axial direction (the Z-axial direction) with respect to the housing 1010 (also moving the first and second lens barrels 1215 and 1220) and moving the second lens barrel 1220 in the optical axial direction (the Z-axial direction) with respect to carrier 1210.

The light which the direction has been changed by the reflecting module 1100 is refracted while passing through the lenses.

The carrier 1210 is configured to be moved in approximately the optical axial direction (the Z-axial direction) in order to implement the AF or zoom function (the first and second lens barrels 1215 and 1220 put on the carrier 1210 may also be moved). In addition, the second lens barrel 1220 is moved in approximately the optical axial direction (the Z-axial direction) in the carrier 1210 in order to implement the AF or zoom function (generally, the AF function is implemented by the movement of the carrier 1210 and the zoom function is implemented by the movement of the second lens barrel 1220 in the carrier 1210, but is not limited thereto).

Therefore, the second driving part 1240 generates driving force so that the carrier 1210 and the second lens barrel 1220 are movable in the optical axial direction (the Z-axial direction). That is, the second driving part 1240 moves the carrier 1210 to change a distance between the lens module 1200 and the reflecting module 1100 or the second lens barrel 1220 provided in the carrier 1210 is moved in the optical axial direction (the Z-axial direction), such that the AF or zoom function may be implemented.

As an example, the second driving part 1240 includes the magnets 1241*a*, 1243*a*, 1245*a*, and 1247*a* and the coils 1241*b*, 1243*b*, 1245*b*, and 1247*b* disposed to face the magnets 1241*a*, 1243*a*, 1245*a*, and 1247*a*.

When power is applied to the coils 1241*b*, 1243*b*, 1245*b*, and 1247*b*, the carrier 1210 in which the magnets 1241*a*, 1243*a*, 1245*a*, and 1247*a* are mounted is moved in the optical axial direction (the Z-axial direction) or the second lens barrel 1220 is moved in the optical axial direction (the Z-axial direction), by electromagnetic interaction between the magnets 1241*a*, 1243*a*, 1245*a*, and 1247*a* and the coils 1241*b*, 1243*b*, 1245*b*, and 1247*b*.

Some 1245*a* and 1247*a* of the magnets 1241*a*, 1243*a*, 1245*a*, and 1247*a* are mounted in the second lens barrel 1220. As an example, magnets 1245*a* and 1247*a* are mounted on side surfaces of the second lens barrel 1220. In addition, the other magnets 1241*a* and 1243*a* are mounted in the carrier 1210. As an example, the other magnets 1241*a* and 1243*a* are mounted on side surfaces of the carrier 1210.

Some 1241*b* and 1243*b* of the coils 1241*b*, 1243*b*, 1245*b*, and 1247*b* are mounted in the housing 1010 to face some 1241*a* and 1243*a* of the magnets. In addition, the other coils 1245*b* and 1247*b* are mounted in the housing 1010 to face the other magnets 1245*a* and 1247*a*.

As an example, the main board 1070 is mounted in the housing 1010 in a state in which the coils 1241*b*, 1243*b*, 1245*b*, and 1247*b* are mounted on the main board 1070.

In an embodiment, when the carrier 1210 and the second lens barrel 1220 are moved, a closed loop control manner of sensing and feeding back positions of the carrier 1210 and the second lens barrel 1220 is used. Therefore, position sensors 1243*c* and 1247*c* may be required in order to perform a closed loop control. The position sensors 1243*c* and 1247*c* may be hall sensors.

The position sensors 1243*c* and 1247*c* are disposed inside or outside the coils 1243*b* and 1247*b*, respectively, and are mounted on the main board 1070 on which the coils 1243*b* and 1247*b* are mounted.

The carrier 1210 is provided in the housing 1010 to be movable in the optical axial direction (the Z-axial direction). As an example, a plurality of third ball bearings 1211 are disposed between the carrier 1210 and the housing 1010.

The third ball bearings 1211 serve as bearings guiding the movement of the carrier 1210 in a process such as an AF process, or the like. In addition, the third ball bearings 1211 serve to maintain an interval between the carrier 1210 and the housing 1010.

The third ball bearings 1211 are configured to be rolled in the optical axial direction (the Z-axial direction) when the driving force moving the carrier 1210 in the optical axial direction (the Z-axial direction) is generated. Therefore, the third ball bearings 1211 guide the movement of the carrier 1210 in the optical axial direction (the Z-axial direction).

Guide grooves 1213 and 1013 accommodating the third ball bearings 1211 therein are formed in facing surfaces of the carrier 1210 and the housing 1010, respectively, and some of the guide grooves 1213 and 1013 are provided to be elongate in the optical axial direction (the Z-axial direction).

The third ball bearings 1211 are accommodated in the guide grooves 1213 and 1013 and are fitted between the carrier 1210 and the housing 1010.

Each of the guide grooves 1213 and 1013 are formed to be elongate in the optical axial direction (the Z-axial direction). In addition, cross sections of the guide grooves 1213 and 1013 may have various shapes such as a round shape, a polygonal shape, and the like.

Here, the carrier 1210 is pressed toward the housing 1010 so that the third ball bearings 1211 are maintained in a state in which they are in contact with the carrier 1210 and the housing 1010.

To this end, the housing 1010 is mounted with pulling yokes 1216 facing the plurality of magnets 1241*a* and 1243*a* mounted in the carrier 1210. The pulling yokes 1216 may be formed of a magnetic material.

Attractive force acts between the pulling yokes 1216 and the magnets 1241*a* and 1243*a*. Therefore, the carrier 1210 is moved in the optical axial direction (the Z-axial direction) by the driving force of the second driving part 1240 in a state in which it is in contact with the third ball bearings 1211.

The second lens barrel 1220 is provided in the carrier 1210 to be movable in the optical axial direction (the Z-axial direction). As an example, fourth ball bearings 1250 are provided between the second lens barrel 1220 and the carrier

1210, and the second lens barrel 1220 is slid or rolled with respect to the carrier 1210 by the fourth ball bearings 1250.

The fourth ball bearings 1250 may be configured to assist in a rolling motion or a sliding motion of the second lens barrel 1220 in the optical axial direction (the Z-axial direction) when the driving force is generated so that the second lens barrel 1220 is moved in the optical axial direction (the Z-axial direction).

Guide grooves 1224 and 1214 accommodating the fourth ball bearings 1250 therein are formed in facing bottom surfaces of the second lens barrel 1220 and the carrier 1210, respectively, and some of the guide grooves are provided to be elongate in the optical axial direction (the Z-axial direction).

The fourth ball bearings 1250 are accommodated in the guide grooves 1224 and 1214 and are fitted between the second lens barrel 1220 and the carrier 1210.

Each of the guide grooves 1224 and 1214 are formed to be elongate in the optical axial direction (the Z-axial direction). In addition, cross sections of the guide grooves 1224 and 1214 may have various shapes such as a round shape, a polygonal shape, and the like.

Here, the second lens barrel 1220 is pressed toward the carrier 1210 so that the fourth ball bearings 1250 are maintained in a state in which they are in contact with the second lens barrel 1220 and the carrier 1210. That is, the second lens barrel 1220 is pressed toward the carrier 1210 in a bottom direction in which the fourth ball bearings 1250 are provided.

To this end, the second lens barrel 1220 is mounted with pulling yokes 1260 facing the magnets 1245*a* and 1247*a* mounted in the carrier 1210. The pulling yokes 1260 may be formed of a magnetic material.

Attractive force acts between the pulling yokes 1260 and the magnets 1245*a* and 1247*a*. Therefore, the second lens barrel 1220 is moved in the optical axial direction (the Z-axial direction) by the driving force of the second driving part 1240 in a state in which it is in contact with the fourth ball bearings 1250.

Figure 12:
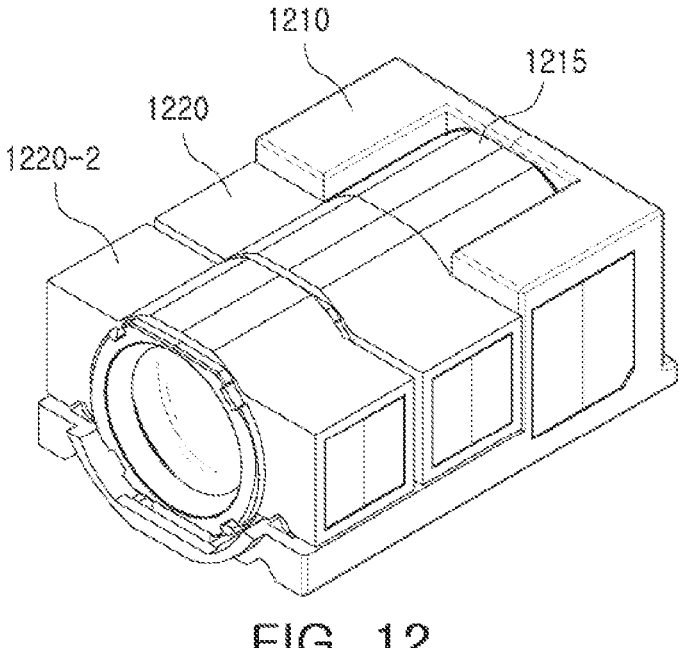
FIG. 12 is an assembled perspective view of a carrier and a lens barrel according to another embodiment.

FIG. 12 is an assembled perspective view of a carrier and a lens barrel according to another embodiment.

In the camera module according to an embodiment, the lens module 1200 includes two or more lens barrels including the lens barrel 1215 fixedly disposed in the carrier 1210. The camera module 1000 described with reference to FIGS. 2 through 11 includes two lens barrels, and the camera module according to another embodiment includes three or more lens barrels.

Referring to FIG. 12, the camera module according to an embodiment includes three lens barrels 1215, 1220, and 1220-2 including the lens barrel 1215 fixedly provided in the carrier 1210. A first lens barrel 1215 and a second lens barrel 1220 are provided as described above, and a third lens barrel 1220-2 is provided in the same structure as that of the second lens barrel 1220 provided in the carrier 1210 in front of the second lens barrel 1220.

In this case, an AF function may be implemented depending on movement of the carrier 1210 in the optical axial direction (the Z-axial direction), and a zoom function may be implemented depending on movement, in the optical axial direction (the Z-axial direction), of some of the lens barrels 1220 and 1220-2 included in the carrier 1210.

In addition, also in an example in which four or more lens modules are provided, a lens barrel may be added to the carrier in the same manner.

Figure 13:
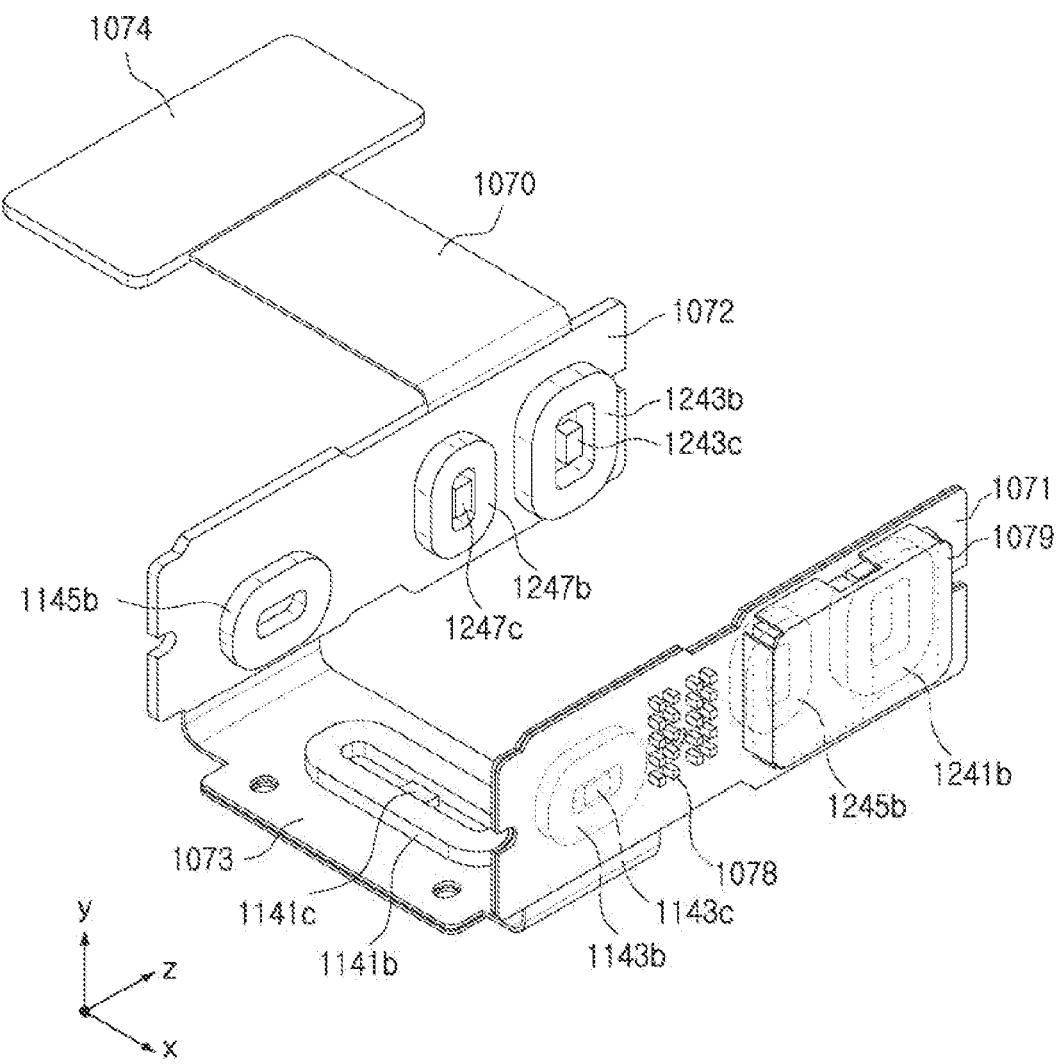
FIG. 13 is a perspective view of a main board according to an embodiment and coils and components mounted on the main board.

FIG. 13 is a perspective view of a main board according to an embodiment and coils and components mounted on the main board.

Referring to FIG. 13, the coils 1141*b*, 1143*b*, and 1145*b* of the first driving part 1140 for driving the reflecting module 1100 and the coils 1241*b*, 1243*b*, 1245*b*, and 1247*b* of the second driving part 1240 for driving the lens module 1200 are mounted on an inner surface of the main board 1070 according to an embodiment. In addition, components 1078 such as various passive elements, active elements, and the like, a gyro sensor 1079, and the like, may be mounted on an outer surface of the main board 1070. Therefore, the main board 1070 may be a double-sided substrate.

In detail, the main board 1070 includes a first side substrate 1071 and a second side substrate 1072 disposed approximately in parallel with each other, and a bottom substrate 1073 connecting the first side substrate 1071 and the second side substrate 1072 to each other, and a terminal part 1074 for connection of an external power supply and a signal is connected to any one of the first side substrate 1071, the second side substrate 1072, and the bottom substrate 1073.

Some of the coils 1143*b* (see FIG. 13) of the coils of the first driving part 1140 for driving the reflecting module 1100, the sensor 1143*c*, and some 1241*b* and 1245*b* (see FIG. 13) of the coils of the second driving part 1240 for driving the lens module 1200 are mounted on the first side substrate 1701.

Some 1145*b* (see FIG. 13) of the coils of the first driving part 1140 for driving the reflecting module 1100, some 1243*b* and 1247*b* (see FIG. 13) of the coils of the second driving part 1240 for driving the lens module 1200, and the sensors 1243*c* and 1247*c* may be mounted on the second side substrate 1702.

The coil 1141*b* of the first driver 1140 for driving the reflecting module 1100 and the sensor 1141*c* of the first driver 1140 for sensing the position of the reflecting module 1100 may be mounted on the bottom substrate 1073.

A case in which the components 1078 such as the various passive elements, active elements, and the like, the gyro sensor 1079, and the like, are mounted on the first side substrate 1071 is illustrated in the drawing, but the components 1078 such as the various passive elements, active elements the gyro sensor 1079, may be mounted on the second side substrate 1072 or be appropriately distributed and mounted on the first side substrate 1071 and the second side substrate 1072.

In addition, the coils 1141*b*, 1143*b*, 1145*b*, 1241*b*, 1243*b*, 1245*b*, and 1247*b* and the position sensors 1141*c*, 1143*c*, 1243*c*, and 1247*c* mounted on the first side substrate 1071, the second side substrate 1072, and the bottom substrate 1073 may be variously distributed and mounted on the respective substrates depending on a design of the camera module.

Figure 14:
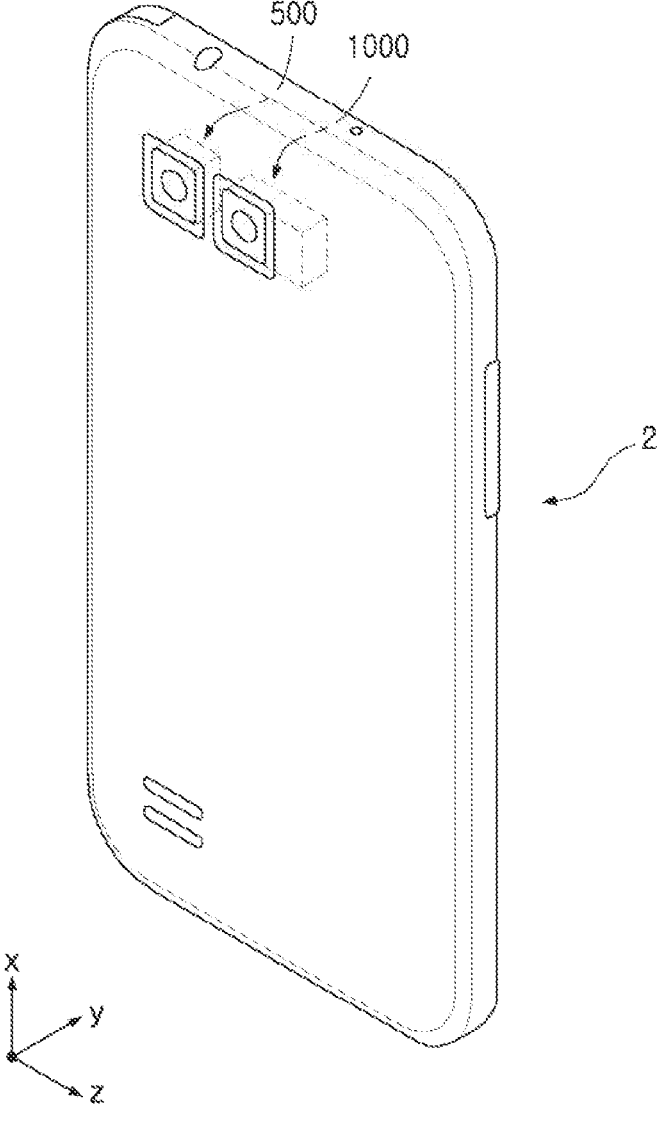
FIG. 14 is a perspective view of a portable electronic device according to another embodiment.

FIG. 14 is a perspective view illustrating a portable electronic device according to an embodiment.

Referring to FIG. 14, a portable electronic device 2 according to an embodiment may be a portable electronic device such as a mobile communications terminal, a smartphone, a tablet personal computer (PC), or the like, in which camera modules 500 and 1000 are mounted.

In an embodiment, the camera modules 500 and 1000 may be mounted in the portable electronic device 2.

At least one of the camera modules 500 and 1000 may be the camera module 1000 according to embodiments described with reference to FIGS. 2 through 18.

That is, a portable electronic device including a dual camera module may include the camera module 1000 according to an embodiment as one or both of two camera modules.

As set forth above, the camera module and the portable electronic device including the same according to embodiments has a simple structure and a reduced size while implementing the auto-focusing function, the zoom function, and the OIS function. In addition, power consumption is significantly reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a housing;
   a carrier disposed in the housing and configured to be movable in an optical axial direction;
   a first lens module fixed to the carrier and configured to be movable in the optical axial direction with respect to the housing;
   a second lens module disposed on the carrier and configured to be movable in the optical axial direction with respect to the carrier;
   a first ball member disposed between the carrier and the second lens module; and
   a second ball member disposed between the housing and the carrier,
   wherein the second ball member is configured to guide movement of the carrier in the optical axial direction.

2. The camera module of claim 1, wherein the second lens module is supported by the carrier in a direction perpendicular to the optical axial direction.

3. The camera module of claim 1, wherein the first lens module comprises:
   a first lens barrel in which the at least one lens is accommodated, and
   wherein the carrier supports the first lens barrel.

4. The camera module of claim 3, further comprising a first driving unit generating a first driving force having a direction parallel to the optical axial direction,
   wherein the first driving unit comprises:
   a first driving magnet disposed on the carrier; and
   a first driving coil disposed in the housing and facing the first driving magnet.

5. The camera module of claim 4, wherein the first lens module and the second lens module are configured to move together in the optical axial direction by the first driving force.

6. The camera module of claim 3, wherein the second lens module comprises a second lens barrel supported by the carrier and configured to be movable with respect to the carrier.

7. The camera module of claim 6, further comprising a second driving unit generating a second driving force having a direction parallel to the optical axial direction, wherein the second driving unit comprises:

a second driving magnet connected to the second lens barrel; and a second driving coil disposed in the housing and facing the second driving magnet.

8. The camera module of claim 7, wherein the second lens barrel is moved in the optical axial direction with respect to the carrier by the second driving force.

9. The camera module of claim 1, further comprising a reflecting module facing the second lens module in the optical axial direction and receiving incident light, wherein the reflecting module is configured to change a direction of the incident light to be parallel to the optical axial direction.

10. The camera module of claim 1, wherein the second lens module is supported by the carrier by a magnetic force in a direction perpendicular to the optical axis direction.

11. A camera module comprising:

a housing having an internal space;

a carrier disposed in the internal space of the housing and configured to be movable in an optical axial direction;

a plurality of lens modules disposed in the carrier, each lens module of the plurality of lens modules comprises at least one lens disposed in the optical axial direction, and wherein the plurality of lens modules comprises:

a first lens module fixed to the carrier and configured to be movable in the optical axial direction with respect to the housing; and a second lens module disposed on the carrier and configured to be movable in the optical axial direction with respect to the carrier, wherein a first ball member disposed between the carrier and the second lens module, wherein the carrier comprises a first guide groove, wherein the second lens module comprises a second guide groove facing the first guide groove, and wherein the first ball member is disposed between the first guide groove and the second guide groove.

12. The camera module of claim 11, wherein at least a portion of the first guide groove and at least a portion of the second guide groove are configured to extend in the optical axial direction, respectively.

13. A camera module comprising:

a housing having an internal space;

a carrier disposed in the internal space of the housing and configured to be movable in an optical axial direction;

a plurality of lens modules disposed in the carrier, each lens module of the plurality of lens modules comprises at least one lens disposed in the optical axial direction, and wherein the plurality of lens modules comprises:

a first lens module fixed to the carrier and configured to be movable in the optical axial direction with respect to the housing;

a second lens module disposed on the carrier and configured to be movable in the optical axial direction with respect to the carrier, and a second ball member disposed between the carrier and the housing, wherein the carrier comprises a third guide groove, wherein the housing comprises a fourth guide groove facing the third guide groove, and wherein the second ball member is disposed between the third guide groove and the fourth guide groove.

14. The camera module of claim 13, wherein the third guide groove is disposed between the second lens module and the housing.

15. A camera module comprising:

a housing having an internal space;

a plurality of lens modules disposed in the internal space, each lens module of the plurality of lens modules comprises at least one lens disposed in an optical axial direction; and a first ball member disposed between the first lens module and the second lens module, wherein the plurality of lens modules comprise a first lens module configured to be movable in the optical axial direction with respect to the housing, and a second lens module supported by the first lens module and configured to be movable in the optical axial direction with respect to the first lens module, wherein the first lens module comprises a first guide groove, wherein the second lens module comprises a second guide groove facing the first guide groove, and wherein the first ball member is disposed between the first guide groove and the second guide groove.

16. A camera module comprising:

a housing having an internal space; and a plurality of lens modules disposed in the internal space, each lens module of the plurality of lens modules comprises at least one lens disposed in an optical axial direction;

wherein the plurality of lens modules comprise a first lens module configured to be movable in the optical axial direction with respect to the housing, and a second lens module supported by the first lens module and configured to be movable in the optical axial direction with respect to the first lens module, wherein a ball member is disposed between the first lens module and the housing, wherein the first lens module comprises a first guide groove, wherein the housing comprises a second guide groove facing the first guide groove, and wherein the ball member is disposed between the first guide groove and the second guide groove.

17. The camera module of claim 16, wherein the second lens module overlaps at least a portion of the first lens module in a direction perpendicular to the optical axis direction, wherein the optical axis passes through the first lens module and the second lens module.

* * * * *